(12) United States Patent
Kucharski et al.

(10) Patent No.: US 10,563,712 B2
(45) Date of Patent: Feb. 18, 2020

(54) TRANSMISSION CLUTCH CONTROL

(71) Applicant: Ford Global Technologies, LLC, Dearborn, MI (US)

(72) Inventors: Joseph F. Kucharski, Livonia, MI (US); Diego Campos Venegas, Mexico City (MX); Kimberly Ann Meehan, Canton, MI (US); Bradley Ronald Heuver, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 153 days.

(21) Appl. No.: 15/659,913

(22) Filed: Jul. 26, 2017

(65) Prior Publication Data

US 2019/0032777 A1 Jan. 31, 2019

(51) Int. Cl.

| F16H 59/46 | (2006.01) |
| F16D 48/06 | (2006.01) |
| F16H 61/02 | (2006.01) |
| F16H 61/686 | (2006.01) |
| F16H 63/30 | (2006.01) |
| F16D 25/0635 | (2006.01) |
| F16D 25/10 | (2006.01) |
| F16D 48/02 | (2006.01) |
| F16H 61/04 | (2006.01) |

(52) U.S. Cl.
CPC ....... *F16D 48/066* (2013.01); *F16D 25/0635* (2013.01); *F16D 25/10* (2013.01); *F16D 25/14* (2013.01); *F16D 48/062* (2013.01); *F16H 59/46* (2013.01); *F16H 61/02* (2013.01); *F16H 61/686* (2013.01); *F16H 63/3026* (2013.01); *F16D 2500/1026* (2013.01); *F16D 2500/1045* (2013.01); *F16D 2500/10412* (2013.01); *F16D 2500/30407* (2013.01); *F16D 2500/50245* (2013.01); *F16H 2059/465* (2013.01); *F16H 2061/0209* (2013.01); *F16H 2061/0462* (2013.01); *F16H 2063/303* (2013.01)

(58) Field of Classification Search
CPC ....... F16H 2059/465; F16H 2061/0209; F16H 2061/0462; F16H 61/0206; F16H 61/0204; F16H 61/04; F16D 2500/30407; F16D 2500/30406; F16D 2500/10206; F16D 48/066; F16D 48/062; F16D 25/10; F16D 25/14
See application file for complete search history.

(56) References Cited

U.S. PATENT DOCUMENTS 5,627,750 A * 5/1997 Kono ................... F16D 48/066
 477/176
5,733,223 A 3/1998 Matsubara et al.
(Continued)

*Primary Examiner* — Erin D Bishop
(74) *Attorney, Agent, or Firm* — David Kelley; Brooks Kushman, P.C.

(57) ABSTRACT

A transmission includes at least one shift element for which both the apply pressure and the release pressure are actively controlled. A controller adjusts the torque capacity of the shift element by varying the apply pressure and the release pressure in a coordinated fashion. During particular events, such as a shift event with the shift element as oncoming element or holding element, both the apply pressure and the release pressure are monotonically increased, mitigating the effect of hysteresis.

20 Claims, 6 Drawing Sheets

(56) References Cited

U.S. PATENT DOCUMENTS 5,772,550 A * 6/1998 Kamada ................ F16H 59/08
475/120
8,682,554 B2 3/2014 Takamatsu et al.
9,115,805 B2 8/2015 Thor

* cited by examiner

TRANSMISSION CLUTCH CONTROL

TECHNICAL FIELD

This disclosure relates to the field of control systems for automatic transmissions for motor vehicles. In particular, this disclosure relates to a hydraulic control system and associated control strategy to improve slip control of oncoming and holding shift elements.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to shift element apply chambers at controlled pressure. A controller adjusts the pressure by sending electrical signals to a valve body.

SUMMARY OF THE DISCLOSURE

In one embodiment, a transmission includes a shift element, a hydraulic control system, and a controller. A piston of the shift elements separates an apply chamber from a release chamber. The shift element may be a clutch which selectively couples two rotating elements. The hydraulic control system independently controls an apply pressure of fluid routed to the apply chamber and a release pressure of fluid routed to the release chamber. The controller is programmed to vary the release pressure to adjust a torque capacity of the shift element. For example, the controller may vary the release pressure to control the torque capacity during a shift event for which the shift element is an oncoming element or is a holding element. The controller may vary the release pressure to adjust a rate of change of slip speed. Specifically, the controller may increase the release pressure in response to the rate of change of slip speed being less than a target. The controller may increase the release pressure of a holding element to initiate slip of the holding element to share the thermal load between oncoming and holding elements.

In another embodiment, a transmission includes a first shift element, a hydraulic control system, and a controller. The first shift element includes a first piston separating a first apply chamber from a second apply chamber. The hydraulic control system is configured to control a first apply pressure of fluid routed to the first apply chambers and a first release pressure of fluid routed to the first release chamber. The controller varies the first release pressure to adjust a slip speed of the first shift element. The transmission may also include a second shift element having a second piston separating a second apply chamber from a second release chamber. The hydraulic control system may route fluid to the second release chamber at the first release pressure or may independently control a second release pressure of fluid routed to the second release chamber. Independent control of the two release pressures may be utilized to control the torque capacities of the shift elements during a shift for which the first shift element is an oncoming element and the second shift element is a holding element.

A method of controlling a transmission shift element includes alternately increasing a pressure of fluid in an apply chamber and increasing a pressure of fluid in a release chamber. The pressure of fluid in the apply chamber is increased in response to a rate of change of slip speed exceeding a target. The pressure of fluid in the release chamber is increased in response to the rate of change of slip speed being less than the target. The method may be utilized, for example, when the shift element is an oncoming element, when the shift element is a holding element, or both.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
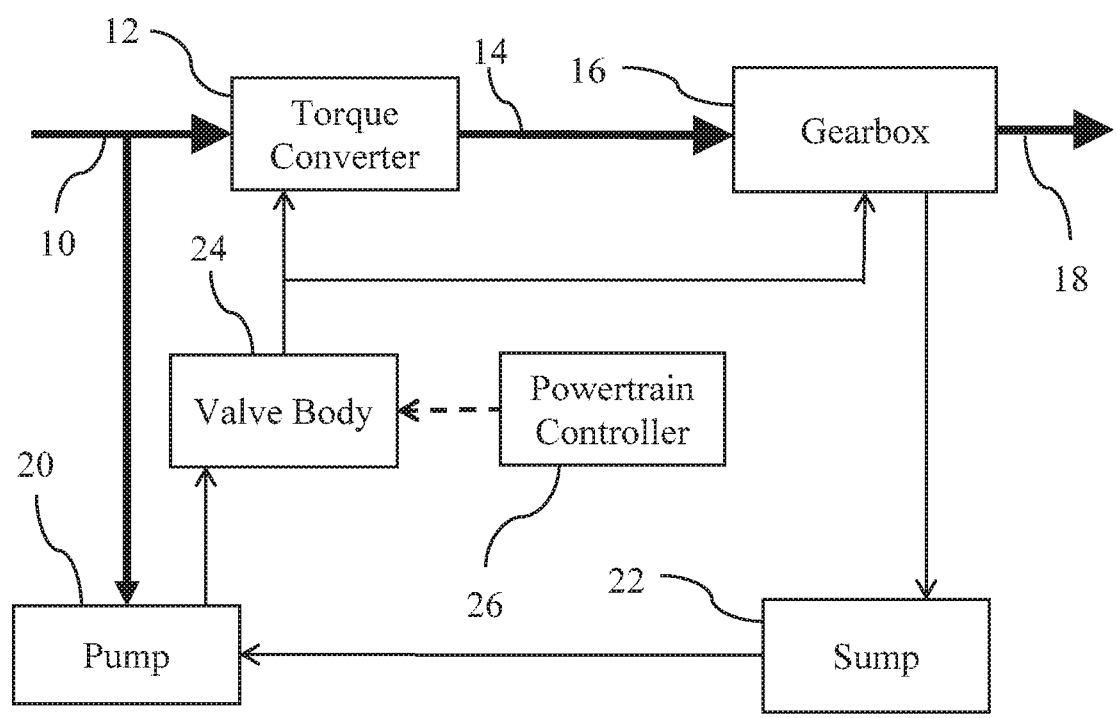
FIG. 1 is a schematic diagram of a transmission system.

FIG. 1 schematically illustrates a vehicle transmission. Bold solid lines represent mechanical power flow connections. Thin solid lines represent the flow of hydraulic fluid. Dashed lined represent the flow of information signals.

Power is supplied at input shaft 10, typically from an internal combustion engine crankshaft. Fluid coupling 12 includes an impeller driveably connected to input shaft 10 and a turbine driveably connected to turbine shaft 14. Power is transmitted from the impeller to the turbine via moving fluid whenever the impeller rotates faster than the turbine. Fluid coupling 12 may be a torque converter which also includes a stator which redirects the fluid when the impeller is rotating substantially faster than the impeller such that the turbine torque is a multiple of the impeller torque. Gearbox 16 includes gearing and shift elements configured to establish various power flow paths between turbine shaft 14 and output 18. Output 18 is driveably connected to vehicle drive wheels, preferably via a differential that permits slight speed differences as the vehicle turns a corner. Each power flow path may be established by engaging an associated subset of the shift elements. At low vehicle speed, a power flow path providing torque multiplication and speed reduction between the turbine shaft and the output shaft may be established to optimize vehicle performance. At higher vehicle speeds, a power flow path providing speed multiplication may be established to minimize fuel consumption.

The shift elements within gearbox 16 are engaged by supplying hydraulic fluid at an elevated pressure to a clutch apply chamber. Each shift element may include a clutch pack having friction plates splined to one component interleaved with separator plates splined to a different component. The fluid forces a piston to squeeze the clutch pack such that frictional force between the friction plates and the separator plates couples the components. The torque capacity of each shift element varies in proportion to changes in the fluid pressure. Pump 20, driven by input shaft 10, draws fluid from sump 22 and delivers it at an elevated pressure, called line pressure, to valve body 24. Valve body 24 delivers the fluid to the clutch apply chambers at a pressure controlled in accordance with signals from powertrain controller 26. Powertrain controller 26 utilizes several input signals including signals from an accelerator pedal, a brake pedal, and a shifter. In addition to the fluid provided to clutch apply chambers, valve body provides fluid for lubrication and provides fluid to torque converter 12. The fluid eventually drains from gearbox 18 back to sump 22 at ambient pressure.

Figure 2:
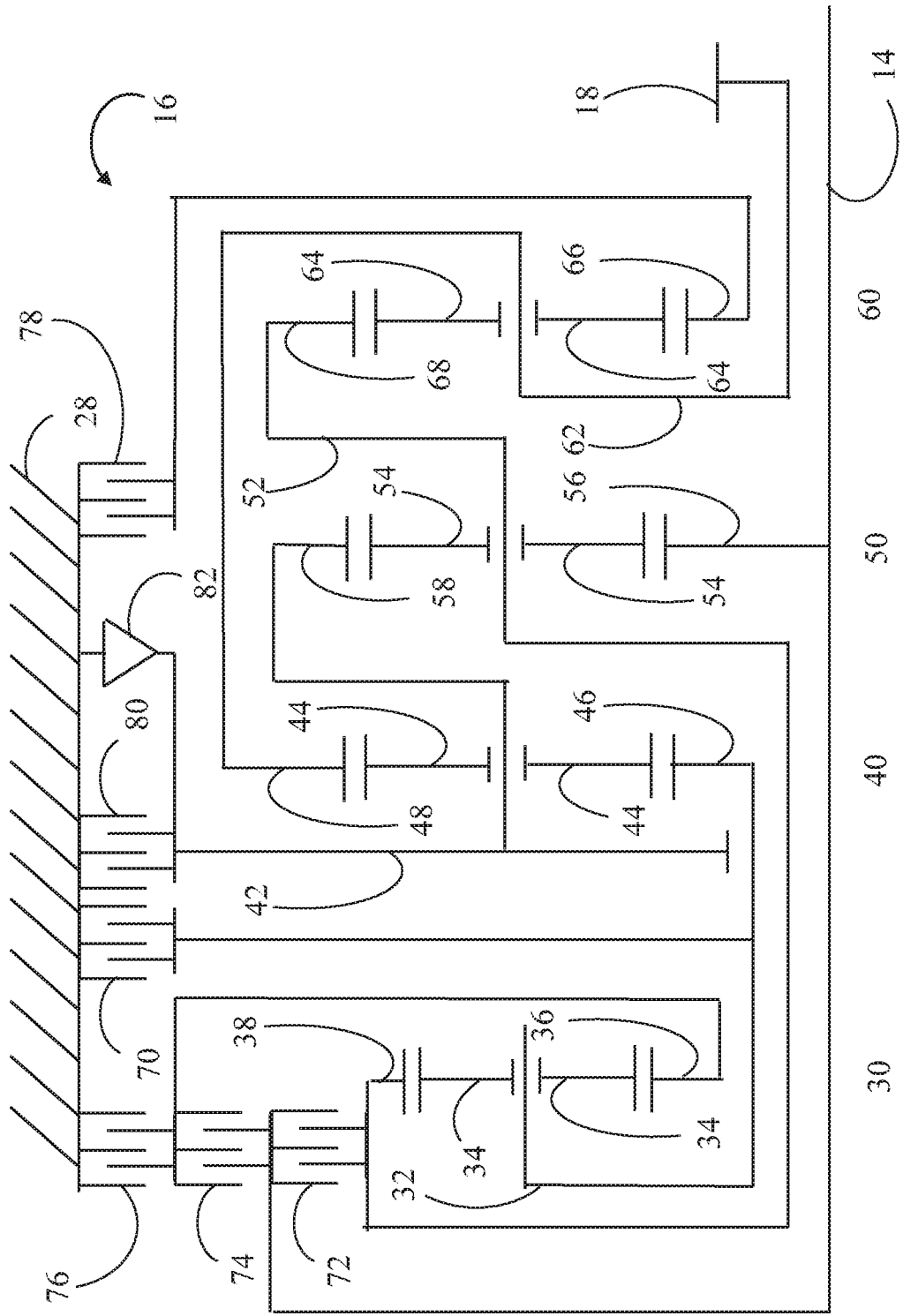
FIG. 2 is a schematic diagram of a transmission gearing arrangement suitable for the gearbox of the transmission system of FIG. 1.

An example gearbox is schematically illustrated in FIG. 2. The gearbox is housed in a transmission case 28 that does not rotate with respect to the vehicle. The transmission utilizes four simple planetary gear sets 30, 40, 50, and 60. Simple planetary gear set 30 includes a carrier 32 that supports several planet gears 34. Planet gears 34 mesh with sun gear 36 and ring gear 38. Simple planetary gear sets 40, 50, and 60 are similarly structured.

Sun gear 56 is fixedly coupled to turbine shaft 14. Ring gear 48 and carrier 62 are fixedly coupled to output 18. Carrier 32 is fixedly coupled to sun gear 46 and selectively held against rotation by brake 70. Ring gear 38, carrier 52, and ring gear 68 are fixedly coupled to one another and selectively coupled to turbine shaft 14 by clutch 72. Sun gear 36 is selectively coupled to turbine shaft 14 by clutch 74 and selectively held against rotation by brake 76. Sun gear 66 is selectively held against rotation by brake 78. Carrier 42 and ring gear 58 are fixedly coupled to one another and is selectively held against rotation by brake 80. One way clutch 82 passively holds carrier 42 and ring gear 58 against rotation in one direction. One way clutch 82 and brake 80 may be implemented as a selectable one way clutch that prevents rotation in one direction at all times and prevents rotation in the other direction only when activated.

A suggested ratio of pitch diameters for each planetary gear set is listed in Table 1.

TABLE 1

| | |
|---|---|
| Ring 38/Sun 36 | 1.51 |
| Ring 48/Sun 46 | 2.22 |
| Ring 58/Sun 56 | 2.22 |
| Ring 68/Sun 66 | 3.08 |

As shown in Table 2, engaging the shift elements in combinations of two establishes eight forward speed ratios and one reverse speed ratio between turbine shaft 14 and output 18. An X indicates that the shift element is required to establish the speed ratio. When the gear sets have tooth numbers as indicated in Table 1, the speed ratios have the values indicated in Table 2.

TABLE 2

| | 70 | 72 | 74 | 76 | 78 | 80/82 | Ratio | Step |
|---|---|---|---|---|---|---|---|---|
| Rev | | | X | | | X | −3.79 | |
| 1st | | | | | X | X | 4.26 | |
| 2nd | X | | | | X | | 2.73 | 1.56 |
| 3rd | | | | X | X | | 2.19 | 1.25 |
| 4th | | | X | | X | | 1.71 | 1.28 |
| 5th | | X | | | X | | 1.33 | 1.29 |
| 6th | | X | X | | | | 1.00 | 1.33 |
| 7th | | X | | X | | | 0.85 | 1.18 |
| 8th | X | X | | | | | 0.69 | 1.23 |

Figure 3:
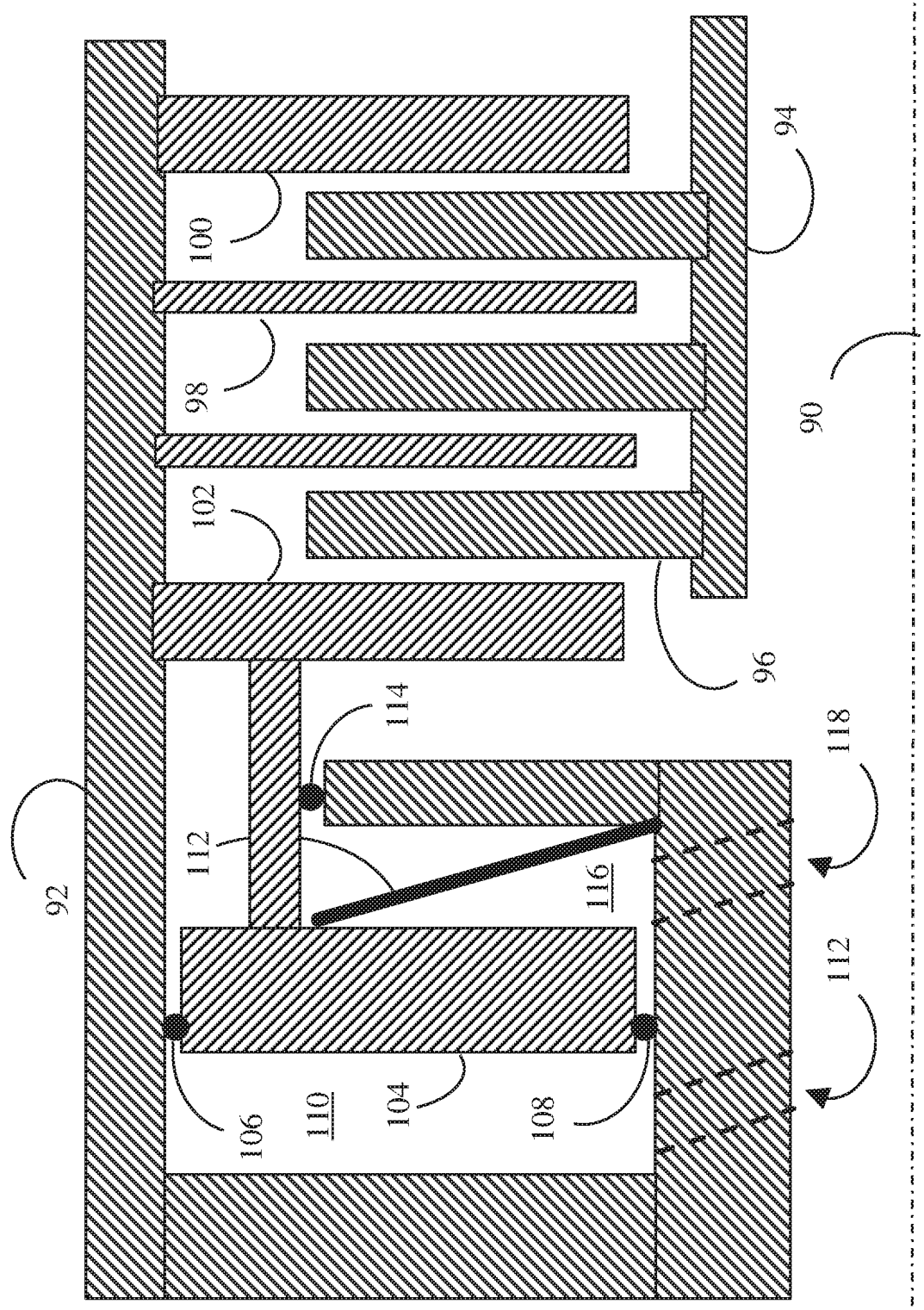
FIG. 3 is a schematic cross section of a representative hydraulically actuated clutch.

FIG. 3 is a schematic cross section of a clutch such as clutches 72 or 74. The clutch is axisymmetric about centerline 90. A clutch housing is fixed to one of the components to be selectively coupled by the clutch. For a brake, the clutch housing is typically fixed to transmission case 28 or formed integrally with transmission case 28. Clutch hub 94 is fixed to the other component to be selectively coupled by the clutch. A set of friction plates 96 is splined to clutch hub 94. A set of separator plates 98 is splined to the clutch housing. The separator plate on one end, called the reaction plate 100, is axially fixed to the clutch housing. The separator plate on the other end is called pressure plate 102.

Piston 104 slides axially with respect to clutch housing 92. Clutch housing 92, piston 104, and seals 106 and 108 define clutch apply chamber 110. Fluid is routed from the valve body to clutch apply chamber 110 via channel 112. To engage the clutch, the controller commands the valve body to increase the pressure of the fluid in apply chamber 110. The fluid pressure pushed piston 104 to the right, squeezing friction plates 96 between the separator plates 98. Friction between the friction plates and the separator plates transmits torque between the selectively coupled components. To release the clutch, the controller commands the valve body to decrease the pressure of fluid in apply chamber 110. Release spring 112 pushes piston 104 to the left, relieving the normal force between the friction plates and the separator plates.

When the clutch housing rotates about axis 90, centrifugal forces increase the pressure of the fluid in apply chamber 110. This can make it difficult to accurately control the torque capacity of the clutch. Clutch housing 92, piston 104, and seals 108 and 114 define clutch release chamber 116. Fluid is routed from the valve body to clutch release chamber 116 via channel 118. Conventionally, the controller regulates the pressure of fluid routed to release chamber 116 to a low value such that the pressure in release chamber 116 is predominantly due to centrifugal force. Conventionally, one hydraulic circuit, such as the lubrication circuit, is fluidly connected to the release chambers of all clutches in the gearbox. The pressure in release chamber 116 acts on the opposite side of piston 104. To the extent possible, the area of the piston exposed to each chamber is equal such that the pressures due to centrifugal forces balance out and the torque capacity is due solely to the commanded pressure in apply chamber 110. Since the housing of a brake does not rotate, centrifugal forces are not present and the release chamber is conventionally omitted.

The torque capacity of the clutch is dictated by the number of friction plates, the diameter of the friction plates, the friction coefficient, the areas of the apply chamber and release chamber, the release spring characteristics, and the pressure of fluid in the apply and release chambers. Of these, only the pressures of fluid in the apply and release chambers are subject to active control by the controller. Conventionally, only the apply pressure is actively controlled in practice.

To shift among transmission ratios, one shift element must be released and another shift element engaged. The shift element to be released is called the off-going shift element and the shift element to be engaged is called the oncoming shift element. For most shifts, one shift element, called the holding element, is engaged in both the initial gear ratio and the final gear ratio. For example, to upshift from 5th gear to 6th gear, brake 78 is the off-going element, clutch 74 is the oncoming element, and clutch 72 is the holding element. In a first phase of the shift, called the preparatory phase, a high pressure is commanded to the apply chamber of the oncoming clutch to rapidly move the piston close to being in contact with the pressure plate. At the same time, the pressure commanded to the off-going clutch is reduced to just above the current torque level. In a second phase of the shift, called the torque phase, the torque capacity of the off-going element is reduced to zero while the torque capacity of the oncoming element is increased, such that the power transfer path switches from that of 5th gear to that of 6th gear. In a third phase of the shift, called the inertia phase, the relative speeds of the transmission components transition to the speed ratios associated with 6th gear.

During the shift, the oncoming clutch transmit torque is the presence of relative speed, called slip, between the components that it selectively couples. As a result, it absorbs heat which eventually dissipates. The quantity of heat absorbed depends upon the turbine shaft speed before and after the shift, the input torque during the shift, the amount of inertia attached to the input, the speed changes of other gearbox components, and the inertia associated with those other internal components. In some shift scenarios, the amount of heat may exceed the amount that the oncoming shift element is designed to absorb. The heat absorbed by the oncoming shift element can be decreased by slipping the holding element during the inertia phase. Slipping the holding element causes the heat to be divided between the oncoming element and the holding element. When circumstances indicate that slipping the holding element during a shift is advisable, the torque capacity of the holding element is reduced during the preparatory phase to just above the current torque level.

When a shift element with a release chamber is stroked during the preparatory phase, fluid in the release chamber must be pushed out. If the release chamber is fluidly connected to the lubrication circuit, then the pressure in the lubrication circuit may increase during this process to force the fluid rapidly through lubrication orifices. If the lubrication circuit is also fluidly connected to other release chambers, then the pressure in those chambers also increases. This can be problematic for the off-going clutch and for a holding clutch being prepared for slipping. The increase in pressure in the release chamber may cause the torque capacity to decrease to less than the current torque level, causing the shift element to slip prematurely or making control of desired slip less accurate.

Figure 4:
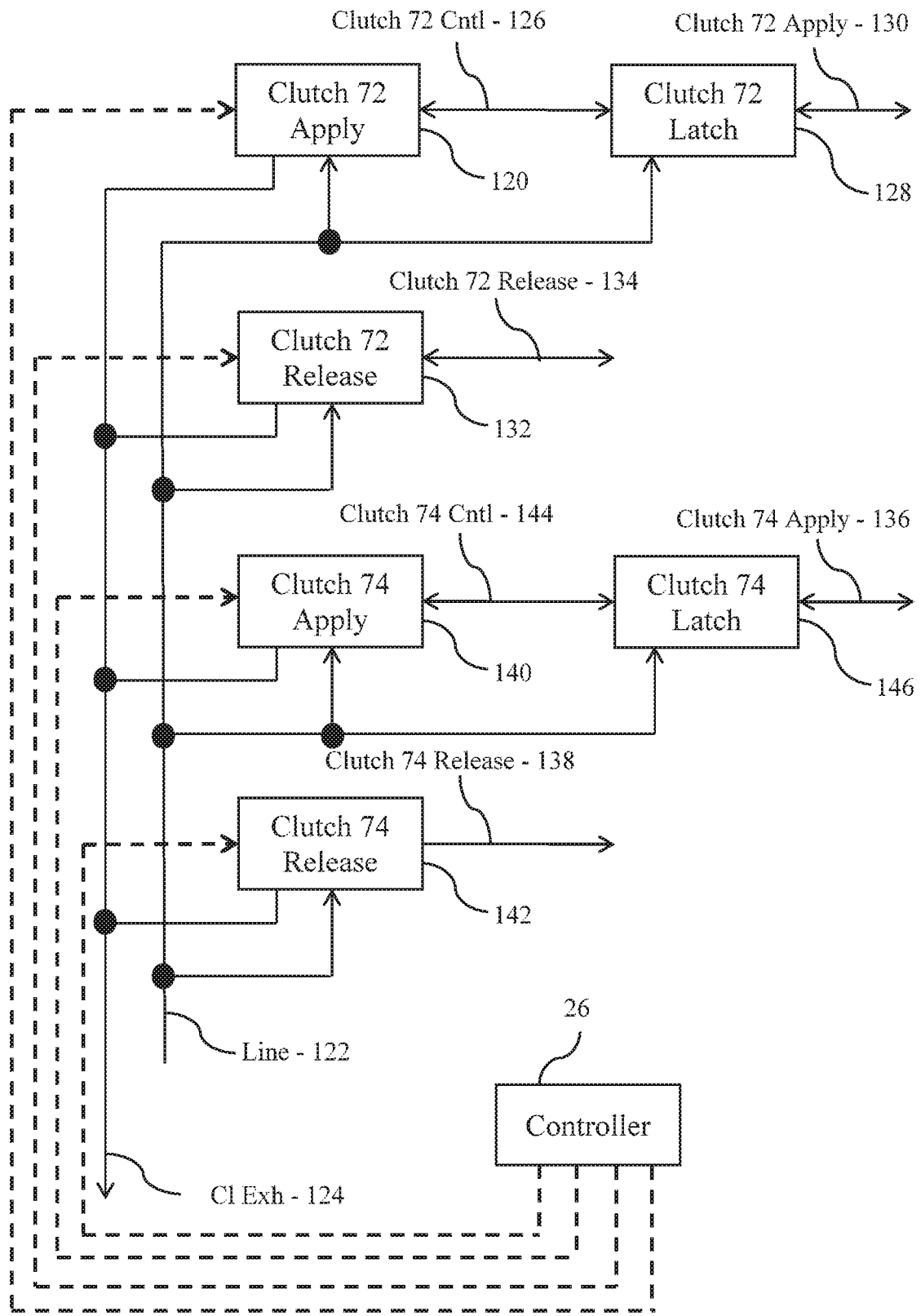
FIG. 4 is a schematic diagram of a portion of a hydraulic control system for the transmission of FIG. 1 having the gearing arrangement of FIG. 2.

FIG. 4 is a schematic diagram of a portion of the hydraulic control system used to control the torque capacities of clutches 72 and 74. Controller 26 adjust the pressure in the apply chamber of clutch 72 by adjusting the magnitude of an electrical current to solenoid valve 120. Solenoid valve 120 has ports connected to line pressure circuit 122 and clutch exhaust circuit 124. When the current is below a threshold, control circuit 126 is fluidly connected to clutch exhaust circuit 124, permitting rapid venting of the fluid. When the current is above the threshold, valve 120 adjust the size of an orifice between line pressure circuit 122 and control circuit 126 such that the pressure in control circuit 126 is proportional to the current. When the pressure in circuit 126 is less than a threshold, latch valve 128 fluidly connects clutch apply circuit 130 to control circuit 126. When the pressure in circuit 126 is above the threshold, latch valve 128 fluidly connects clutch apply circuit 130 to line pressure circuit 122. This allows for continuous adjustment of the clutch apply pressure up to the threshold and for a much higher pressure at times when pressure control is not required.

Controller 26 adjust the pressure in the release chamber of clutch 72 by adjusting the magnitude of an electrical current to solenoid valve 132. When the current is below a threshold, release circuit 134 is fluidly connected to clutch exhaust circuit 124, permitting rapid venting of the fluid. When the current is above the threshold, valve 132 adjust the size of an orifice between line pressure circuit 122 and release circuit 134 such that the pressure in release circuit 134 is proportional to the current. In the implementation of FIG. 4, no latch valve is used for the release circuit.

Similarly, controller 26 controls the pressures to the apply circuit 136 and the release circuit 138 of clutch 74 by adjusting the current to solenoid valves 140 and 142 respectively. Solenoid valve 140 directly controls the pressure in control circuit 144, which controls the pressure in apply circuit 136 via latch valve 146. Whenever either shift element 72 or 74 is being stroked, the corresponding release circuit is vented to allow rapid stroking. The pressure in the other release circuit is not impacted. In some embodiments, valve 142 may be omitted and release circuit 134 may be routed to the release chambers of both clutches 72 and 74. In these embodiments, a low current to solenoid 132 during a preparatory phase has the effect of venting the shared release circuit. As a result, the oncoming clutch may be rapidly stroked without significant elevation of the pressure in the release chamber of the other clutch.

Figure 5:
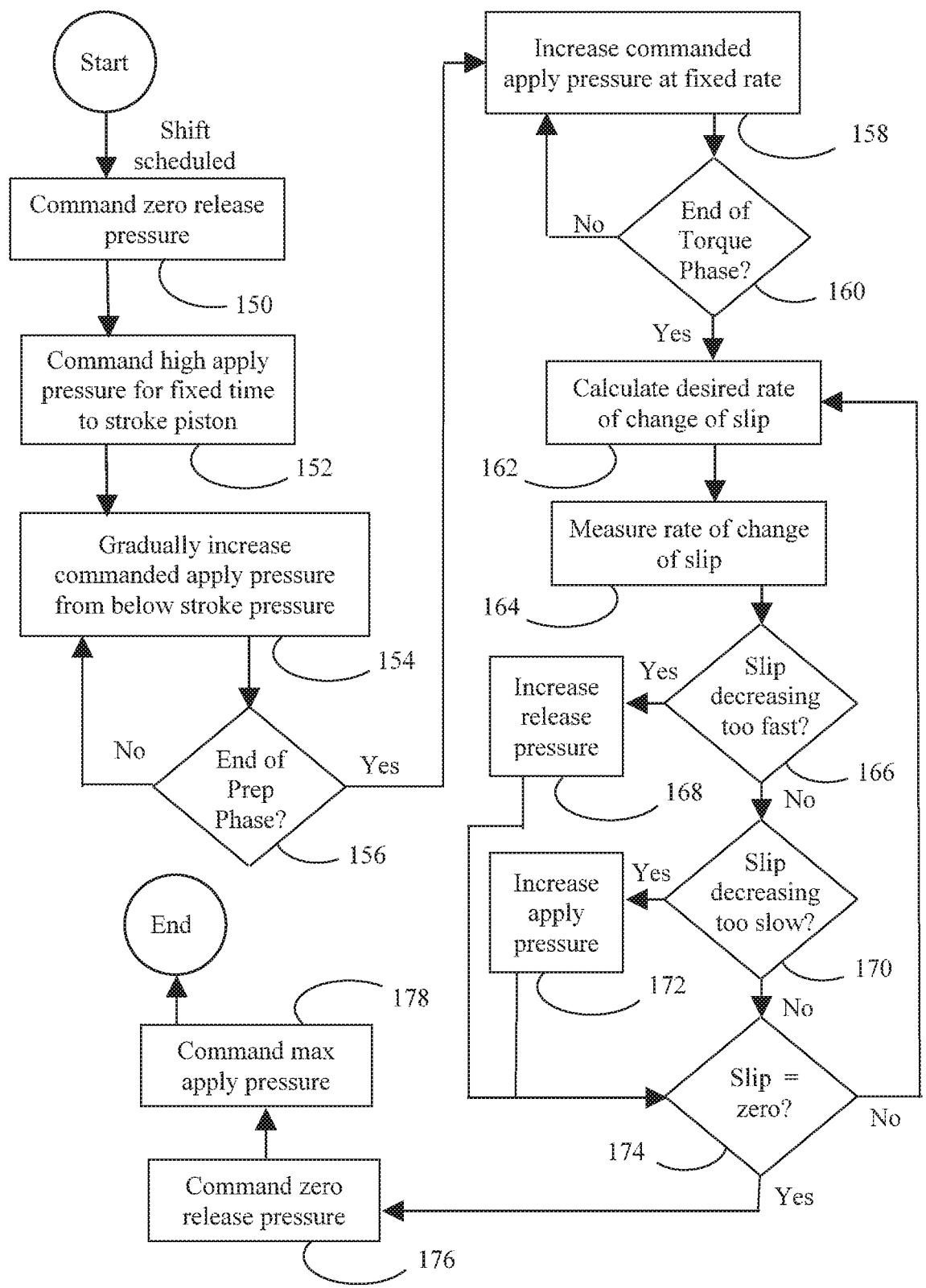
FIG. 5 is a flowchart for a method of controlling an oncoming shift element during a shift event.

Consider a shift from 5th gear to 6th gear. As shown in Table 2, brake 78 is the off-going element, clutch 74 is the oncoming element, and clutch 72 is a holding element. FIG. 5 illustrates a method of controlling the oncoming element. The procedure starts in response to the shift being scheduled. During the preparatory phase, the piston of the oncoming element is stroked as rapidly as feasible. At 150, the controller commands zero pressure to the release chamber. At 152, the controller commands a high pressure to the apply chamber for a predetermined time in order to move the piston rapidly most of the way to the stroke position. Then, at 154, the controller gradually increases the pressure in the apply chamber until torque capacity is detected at 156, marking the end of the preparatory phase. During the torque transfer phase, the apply pressure is increased at a predetermined rate at 158 until the end of the torque transfer phase is detected at 160. During the inertia phase, the controller adjusts the apply pressure and the release pressure to obtain a desired rate of change of slip. At 162, the controller calculates the desired rate of change of slip. For the oncoming element, the slip should be monotonically decreasing, so the desired rate of change of slip is always negative. At 164, the controller measures the current rate of change of slip. If the controller determines at 166 that the slip is decreasing too rapidly (implying more torque capacity than desired), then the controller increases the release pressure at 168. If, on the other hand, the slip is decreasing too slowly at 170, then the controller increases the apply pressure at 172. If the measured rate of change of slip is within a threshold margin of the desired rate of change of slip, then both pressures are held steady. This process continues until the slip reaches zero at 174, indicating the end of the inertia phase. To complete the shift, the controller commands zero release pressure at 176 and maximum apply pressure at 178.

When only the apply pressure is adjusted, it must be both increased and decreased to achieve the desired rate of change of slip. However, there may be hysteresis in the relationship between commanded pressure and torque capacity such that the torque capacity does not immediately start decreasing when the pressure is decreased after a period of increasing pressure. In the control strategy of FIG. 5, the commanded pressures are both monotonically increasing. Therefore, a commanded change in pressure will have an immediate impact on torque capacity even in the presence of hysteresis.

Figure 6:
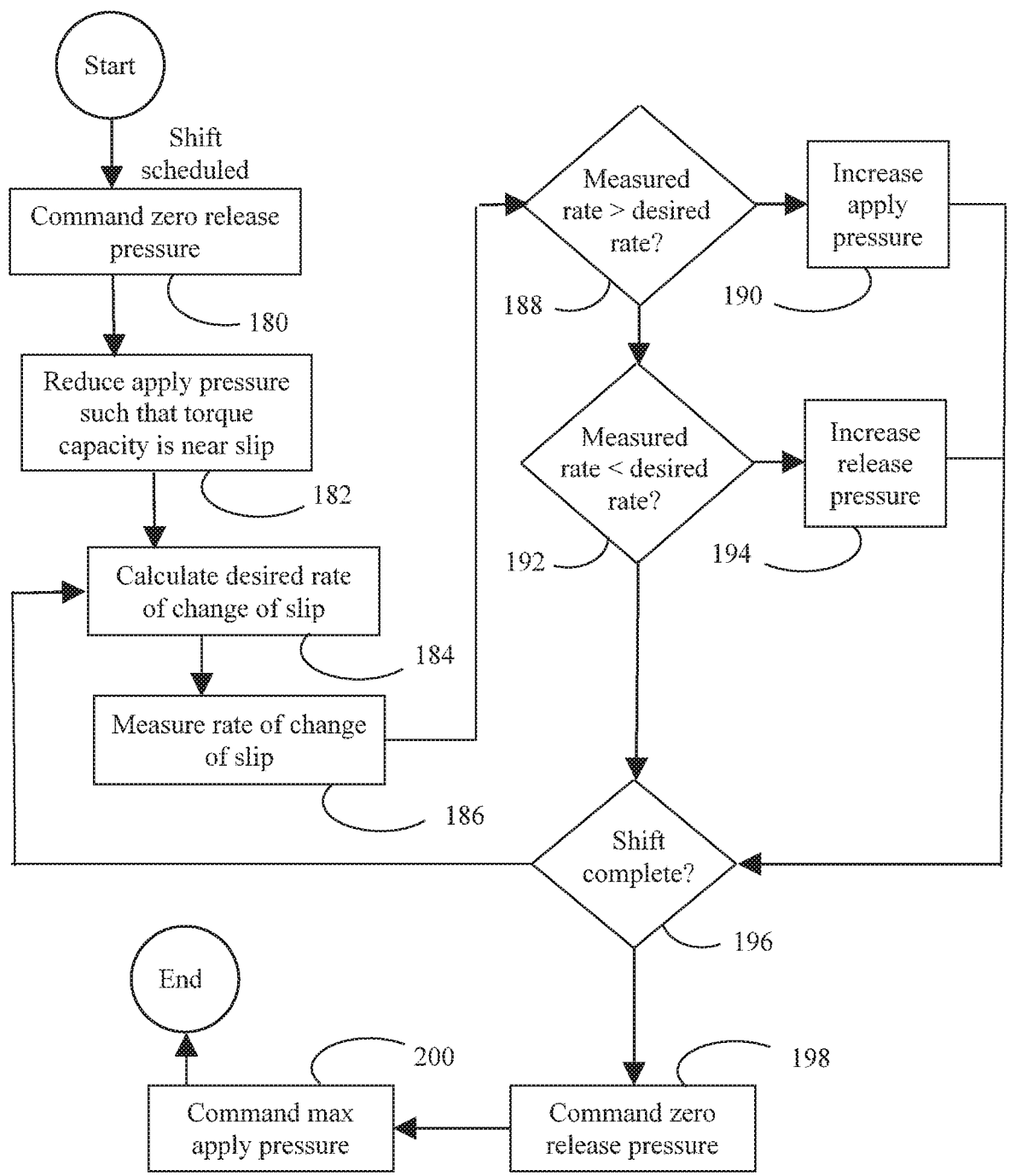
FIG. 6 is a flowchart for a method of controlling a holding shift element during a shift event.

FIG. 6 illustrates a control method for controlling slip on a holding element to reduce the energy dissipated into the oncoming element. When the shift is scheduled, the holding element is prepared by commanding zero release pressure at 180 and reducing the apply pressure at 182 such that the torque capacity is just enough to avoid slip. At 184, the controller calculates a desired rate of change of slip. For the holding element, the desired rate of change of slip may be positive (increasing slip) or negative (decreasing slip). At 186, the controller measures the current rate of change of slip. If the controller determines at 188 that the measured rate exceeds the desired rate (slip is increasing too rapidly or decreasing too slowly), then the controller increasing the apply pressure at 190. Conversely, if the measured rate is less than the desired rate at 192, the release pressure is increased at 194. This process continues until the end of the shift is detected at 196. At the conclusion of the shift, the release pressure is commanded to zero at 198 and the apply pressure is commanded to maximum at 200. As with the method of FIG. 5, both pressures change monotonically, mitigating the adverse impact of hysteresis.

In order to utilize the methods of FIG. 5 and FIG. 6 simultaneously, independent control of the release pressure in both the oncoming element and the holding element are required. However, some advantages accrue even when the two release chambers are fluidly connected to a single hydraulic circuit with controlled pressure. During the preparatory phase, that single circuit is vented, minimizing any pressure build-up from evacuating the release chamber of the oncoming element. Therefore, the other element does not need to compensate. For shifts in which one of the clutches is disengaged throughout, the methods of FIG. 5 or 6 may be used to control the other clutch.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
   an input;
   an output;
   a gearbox including a gearing arrangement having a plurality of shift elements selectively engageable to create power flow paths between the input and the output, wherein a first of the shift elements has a piston separating an apply chamber from a release chamber;
   a hydraulic control system configured to control an apply pressure of fluid routed to the apply chamber and to independently control a release pressure of fluid routed to the release chamber; and
   a controller programmed to vary the release pressure to adjust a torque capacity of the first shift element.

2. The transmission of claim 1 wherein the gearing arrangement includes at least two rotatable elements, and wherein the first shift element is a clutch configured to selectively couple the two rotatable elements to one another.

3. The transmission of claim 1 wherein the controller varies the release pressure to adjust the torque capacity during a shift event for which the shift element is an oncoming element.

4. The transmission of claim 1 wherein the controller varies the release pressure to adjust the torque capacity during a shift event for which the shift element is a holding element.

5. The transmission of claim 1 wherein the controller increases the release pressure to initiate slip of a holding element during a shift event.

6. A transmission comprising:
   a shift element having a piston separating an apply chamber from a release chamber;
   a hydraulic control system configured to control an apply pressure of fluid routed to the apply chamber and to independently control a release pressure of fluid routed to the release chamber; and
   a controller programmed to vary the release pressure to adjust a torque capacity of the shift element, wherein the controller varies the release pressure to adjust a rate of change of slip speed.

7. The transmission of claim 6 wherein the controller increases the release pressure in response to the rate of change of slip speed being less than a desired rate of change of slip speed.

8. The transmission of claim 6 wherein the shift element is a clutch that is configured to selectively couple two rotatable elements to one another.

9. The transmission of claim 6 wherein the controller varies the release pressure to adjust the torque capacity during a shift event for which the shift element is an oncoming element.

10. The transmission of claim 6 wherein the controller varies the release pressure to adjust the torque capacity during a shift event for which the shift element is a holding element.

11. The transmission of claim 6 wherein the controller increases the release pressure to initiate slip of a holding element during a shift event.

12. The transmission of claim 6 further comprising a gearbox, wherein the first shift element is disposed in the gearbox.

13. A transmission comprising:
- a first shift element having a first piston separating a first apply chamber from a first release chamber;
- a second shift element having a second piston separating a second apply chamber from a second release chamber;
- a hydraulic control system configured to control a first apply pressure of fluid in the first apply chamber and to independently control a first release pressure of fluid in the first release chamber, and the hydraulic control system is further configured to independently control a second apply pressure of fluid routed to the second apply chamber and to route fluid to the second release chamber at the first release pressure; and
- a controller programmed to vary the first release pressure to adjust a slip speed of the first shift element.

14. The transmission of claim 13 wherein the controller and the hydraulic control system are configured to vent fluid from the first and second release chambers while moving the first piston to a stroked position.

15. The transmission of claim 13 wherein the hydraulic control system is further configured to independently control a second release pressure of fluid routed to the second release chamber.

16. The transmission of claim 15 wherein the controller is further configured to adjust the first and second release pressures to adjust torque capacities of the first and second shift elements during a shift for which the first shift element is an oncoming element and the second shift element is a holding element.

17. The transmission of claim 13, wherein the first shift element is a clutch.

18. The transmission of claim 13, wherein the second shift element is a clutch.

19. The transmission of claim 13 further comprising:
- an input;
- an output;
- a gearing arrangement configured to change a speed relationship between the input and the output and including at least first and second rotatable elements, wherein the first shift element is a clutch configured to selectively couple the first and second rotatable elements to one another.

20. The transmission of claim 13 further comprising a gearbox, wherein the first and second shift elements are disposed in the gearbox.

* * * * *